United States Patent
Melchor et al.

(10) Patent No.: US 12,549,601 B1
(45) Date of Patent: Feb. 10, 2026

(54) CRYPTOGRAPHIC MEDIATION OF COMMUNICATION CHANNELS FOR SOFTWARE APPLICATIONS

(71) Applicant: SB Technology, Inc., Wilmington, DE (US)

(72) Inventors: Carlos Aguilar Melchor, Toulose (FR); Dongze Yue, San Francisco, CA (US); Marc Manzano Castro, Madrid (ES)

(73) Assignee: SB Technology, Inc., Wilmington, DE (US)

( * ) Notice: Subject to any disclaimer, the term of this patent is extended or adjusted under 35 U.S.C. 154(b) by 615 days.

(21) Appl. No.: 17/976,663

(22) Filed: Oct. 28, 2022

(51) Int. Cl.
*H04L 9/40* (2022.01)

(52) U.S. Cl.
CPC ........ *H04L 63/166* (2013.01); *H04L 63/1433* (2013.01); *H04L 63/20* (2013.01)

(58) Field of Classification Search
CPC ............. H04L 63/0428; H04L 63/0471; H04L 63/166; H04L 63/1433; H04L 63/20; H04L 63/205
See application file for complete search history.

(56) References Cited

U.S. PATENT DOCUMENTS

| | | | |
|---|---|---|---|
| 8,281,385 B2 * | 10/2012 | Callagahan | H04L 63/029 726/15 |
| 10,033,703 B1 * | 7/2018 | Sharifi Mehr | H04L 63/0428 |
| 10,374,800 B1 * | 8/2019 | Sharifi Mehr | H04L 63/20 |
| 12,113,894 B1 * | 10/2024 | Huberman | H04L 63/166 |
| 2011/0191442 A1 * | 8/2011 | Ovsiannikov | H04L 63/0428 709/228 |

(Continued)

FOREIGN PATENT DOCUMENTS

EP    3562115 A1 * 10/2019 ......... H04L 63/0428

OTHER PUBLICATIONS

Barton, J., Pitropakis, N., Buchanan, W., Sayeed, S., & Abramson, W. (Feb. 2022). Post Quantum Cryptography Analysis of TLS Tunneling on a Constrained Device. Presented at 8th International Conference on Information Systems Security and Privacy, Online (Year: 2022).*

*Primary Examiner* — Michael R Vaughan
(74) *Attorney, Agent, or Firm* — Morgan, Lewis & Bockius LLP

(57) ABSTRACT

A method applies secure cryptographic communication between legacy applications and corresponding external services. A user device has one or more processors and memory, and runs a legacy application. The application receives input (e.g., from a user). In response to the input, the application initiates communication over a secure communication protocol to an external service not running on the user device. A client crypto-service encapsulates the communication and provides a secure encrypted tunnel to a server crypto-service, at a server system, in communication with the external service. The server system has one or more processors and memory. The server system receives the encapsulated communication at the server crypto-service and sends the communication to the external service. The server system then receives a response to the communication from the external service and returns the response, through the secure encrypted tunnel, to the user device.

20 Claims, 17 Drawing Sheets

(56) References Cited

U.S. PATENT DOCUMENTS

| | | | | |
|---|---|---|---|---|
| 2013/0121147 A1* | 5/2013 | Tapia | .................... | H04L 1/0001 |
| | | | | 370/230 |
| 2015/0237104 A1* | 8/2015 | Oguchi | .................. | H04L 65/65 |
| | | | | 709/231 |
| 2023/0130121 A1* | 4/2023 | Peddada | ............... | H04L 9/3268 |
| | | | | 713/171 |
| 2023/0412583 A1* | 12/2023 | Purta | ................... | H04L 61/5007 |

* cited by examiner

Legend:
502 = handshake direct delegation
504 = handshake direct offloading

```
service SecureTransportService {
        // aqcsd API for requesting for a secure transport.
        rpc RequestSecureTransport (SecureTransportRequest) returns
(HandshakeRelayMsg) {}

// aqcsd API for finally establishing for a secure transport.
        rpc EstablishSecureTransport (HandshakeRelayMsg) returns
(SecureTransportResponse) {}
} message SecureTransportRequest {
        // Record protocols supported by the caller. e.g. "tls", "quic".
        // The RecordProtocol message contains the protocol name, version,
as well as supported symmetric primitives.
        repeated RecordProtocol supported_record_protocols = 1;

// The destination of the secure transport.
        string destination = 2;

// Whether the current party is initiating or receiving the secure
transport request.
        bool is_initiating_request = 3;

// TODO: add more fields for authentication.
} message HandshakeRelayMsg {
        // Content of the handshake, in raw data format, to be relayed to
the remote.
        bytes handshake_data_raw = 1;
} message SecureTransportResponse {
        // Record protocol selected by aqcsd.
        RecordProtocol selected_record_protocol = 1;

// Internal state (master key, IV, nonce, counter value, etc.) of a
negotiated session over the selected record protocol.
        SessionState session_state = 2;
}
```

Figure 10

```
/**** CONTROL PLANE ****/

// cfg_buf is the serialized protobuf version of the policies message
// Initialize ctx according to the given policies. Returns AQCS_SUCCESS if
// successful, otherwise one of the error code.
AQCS_RES aqcs_control_new(aqcs_control_ctx* ret, uint8_t const*
policies_buf, size_t policies_len);

// Modify policies in the aqcs_ctx object.
// It is not safe to change policies in a thread different from the one
that
// processes handshakes and records.
AQCS_RES aqcs_control_policies_set(aqcs_control_ctx* ctx, uint8_t const*
policies_buf, size_t policies_len);

// Can't fail. if ctx == NULL, does nothing.
void aqcs_control_delete(aqcs_control_ctx* ctx);
```

Figure 11A

```
/**** HANDSHAKE PLANE ****/

// Sandwich stream-based interface for handshakes. Supports non blocking
mode (see return codes).
AQCS_RES aqcs_hs_new_initiator(aqcs_hs_ctx** ret, aqcs_tunnel_type tunnel,
aqcs_control_ctx const* ctx, sandwich_stream* stream);
AQCS_RES aqcs_hs_new_receiver(aqcs_hs_ctx** ret, aqcs_tunnel_type tunnel,
aqcs_control_ctx const* ctx, sandwich_stream* stream);

// Make the actual handshake.
// Returns:
// * AQCS_HS_SUCCESS if successful
// * AQCS_HS_FAILURE otherwise. Call TODO to get more information.
// Moreover, in non blocking mode:
// * returns AQCS_FD_WANTS_READ if the handshake needs more data from the
underlying fd. Call this function again when the condition is okay.
// * returns AQCS_FD_WANTS_WRITE if the handshake needs to be able to write
data to the underlying fd. Call this function again when the condition is
okay.
// In blocking mode, do the complete handshake.
AQCS_RES aqcs_hs_do(aqcs_hs_ctx* ctx);

// Get the current status of the handshake state machine.
AQCS_RES aqcs_hs_status(AQCS_HS_STATUS* ret, aqcs_hs_ctx const* ctx);

// Get secrets. If the status isn't FINISHED, returns an error.
AQCS_RES aqcs_hs_get_secrets(aqcs_hs_ctx const* ctx, uint8_t**
initiator_secrets, uint8_t** receiver_secrets);

void aqcs_hs_delete(aqcs_hs_ctx* ret);

// Handshake API below are for future reflections, and not to implement as
a first version.
// Initialize a new handshake.
// TODO: good remark from laurent: what happens with protocol that sends
data
// as part of the handshake? (potentially TLS 1.3 0-RTT mode?)
AQCS_RES aqcs_hs_action_new_initiator(aqcs_hs_ctx* ret, aqcs_tunnel_type
tunnel, aqcs_control_ctx const* ctx);
AQCS_RES aqcs_hs_action_new_receiver(aqcs_hs_ctx* ret, aqcs_tunnel_type
tunnel, aqcs_control_ctx const* ctx);

struct BufferView {
  uint8_t const* buf;
  size_t len;
};
```

Figure 11B

```
// Process input handshake data. Returns handshake data to gives back.
data_out
// must be free'd by the caller. I guess we need to make a std::vector-like
// interface here to saves memory allocation/frees.
// This is where sandwich comes into play!
enum HSNextActionID {
  HSStepSendData,
  HSStepRecvData
}
struct HSActionInRecvData {
  size_t len;
};
struct HSActionOutRecvData {
  BufferView data;
};
struct HSActionInSendData {
  BufferView data;
};
struct HSActionOutSendData {
};
struct HSNextAction {
  HSNextActionID action;
  union {
    HSActionInRecvData recv_data;
    HSActionInSendData send_data;
  } in_params;
};
struct HSActionRes {
  HSNextActionID action;
  union {
    HSActionOutRecvData recv_data;
    HSActionOutSendData send_data;
  } in_params;
};

AQCS_RES aqcs_hs_action_step(aqcs_hs_ctx** ret, HSNextAction* next_action,
HSActionRes const* prev_action_res);
```

Figure 11C

```
/**** RECORD PLANE ****/

// Stream-based interface.
AQCS_RES aqcs_record_fd_new(aqcs_record_ctx** ret, aqcs_control_ctx const*
ctx, uint8_t const* secret_frame, const size_t secret_frame_len, uint8_t
const* secret_unframe, size_t secret_unframe_len, int fd);
AQCS_RES aqcs_record_ktls_new(aqcs_record_ctx** ret, aqcs_control_ctx
const* ctx, uint8_t const* secret_frame, const size_t secret_frame_len,
uint8_t const* secret_unframe, size_t secret_unframe_len);
// TODO: return codes for unblocking mode
AQCS_RES aqcs_record_write(aqcs_record_ctx* ctx, uint8_t const* data,
size_t len);
// TODO: return codes for unblocking mode
AQCS_RES aqcs_record_read(aqcs_record_ctx* ctx, uint8_t* buf, size_t len);
void aqcs_record_delete(aqcs_record_ctx* ctx);
```

Figure 11D

CRYPTOGRAPHIC MEDIATION OF COMMUNICATION CHANNELS FOR SOFTWARE APPLICATIONS

TECHNICAL FIELD

The disclosed implementations relate generally to secure network communication and more specifically to a dynamic cryptographic layer that can select an appropriate cryptographic protocol at runtime.

BACKGROUND

Any communication over a public network (such as the Internet) creates an opportunity for valuable information to be intercepted and/or copied. For this reason, various security protocols are used to encrypt any data that is transmitted. However, there is a wide range of encryption protocols, which provide varying levels of protection.

There are many risks associated with the current security techniques. First, many of the techniques are not very robust against even modest attacks. Second, legacy applications are typically tied to a specific implementation of a security protocol. If the specific protocol is inadequate or compromised, the legacy application has to be reconfigured and/or recompiled. Third, with quantum computing in the near future, many of the existing security protocols will become even easier to break.

Most of the widely adopted transport security protocols (e.g., TLS, DTLS, QUIC, IPSec, WireGuard, or SRTP) consist of two major components: (1) a handshake protocol for negotiating parameters, authenticating the endpoints, and establishing shared keys; and (2) a record protocol to encrypt traffic using keys and parameters provided by the handshake protocol.

Originally, protocols such as TLS were designed to tightly bundle the handshake and the record protocols so that a single execution of the protocol does everything. However, concepts such as kernel TLS, keyless TLS, and distributed session resumption, force the TLS implementations to break up the handshake and the record layers. This makes it possible to perform a handshake operation and encryption of application data via records at two different places.

On the other hand, protocols such as IPSec are designed to have a clear separation between the handshake protocol and the record protocol (IKEv2 and ESP), which allows various high performance and versatility applications. Some protocols, such as DTLS-SRTP and QUIC, leverage one protocol (e.g., DTLS) to derive the session secret, and then use SRTP/QUIC as the record protocol to transport the actual data.

SUMMARY

To address the weaknesses of existing security protocols, the disclosed crypto-service separates cryptographic management from applications and services, giving control to IT administrators to determine the security policy dynamically. This enables strict compliance in a given environment and provides control of cryptography across an entire organization.

Disclosed crypto-service implementations (e.g., AQ CryptoService or aqcs) provide at least four strategic advantages:

The crypto-service takes care of all cryptographic needs, for all legacy applications.

The crypto-service provides crypto-agility: policies control what cryptographic protocols are applied; and new, updated, and/or fixed algorithms are automatically available and utilized.

The crypto-service provides crypto sovereignty. For example, two different organizations can select different cryptographic policies (and thus different algorithms), even if they are running the same legacy applications.

The crypto-service provides production-grade performance and opportunistic optimizations.

In accordance with some implementations, a method implements secure cryptographic communication between legacy applications and corresponding external services. The method is performed at a user device and a server system. The user device has one or more processors and memory. The user device receives input (e.g., from a user) directed to a legacy application. In response to the input, the user device initiates communication over a secure communication protocol to an external service not running on the user device. The user device routes the communication to the client crypto-service, which encapsulates the communication into a secure encrypted tunnel to a server crypto-service, at a server system, in communication with the external service. In some implementations, the legacy application has been modified to route the communication to the client crypto-service. In some implementations, the legacy application is not modified, but the communication is routed to the client crypto-service based on a configuration parameter for I/O channels. In some implementations, the communication is routed to the client crypto-service according to an operating system policy.

The server system has one or more processors and memory. The server system receives the encapsulated communication at the server crypto-service. The server crypto-service sends the communication to the external service. The server crypto-service receives a response to the communication from the external service and returns the response, through the secure encrypted tunnel, to the user device.

In some instances, communication between the client crypto-service and the server crypto-service uses a quantum-resistant cryptographic algorithm. In general, the crypto-service can alternate seamlessly between different cryptographic algorithms and protocols.

In some instances, the input is from a user at the user device. In some instances, the input is generated by a program, process, procedure, or function running on the user device.

In some implementations, the secure communication protocol uses Transport Layer Security (TLS). The crypto-service can leverage any secure communication protocol.

In some implementations, the external service runs at the server system (i.e., both the server crypto-server and the external service run on same server system). In some implementations, the server crypto-service and the external service execute at distinct computing systems.

In some implementations, the server crypto-service communicates with the external service through a load balancer. In some implementations, the load balancer is part of the server crypto-service. The load balancer communicates with the external service over a secure channel.

In some implementations, encapsulating the communication entails intercepting outbound communication from the user device by a local network filter and redirecting the outbound communication to the client crypto-service. The client crypto-service parses the destination and builds a secure tunnel with the destination (either by configuration, or opportunistically). The client crypto-service encapsulates the original traffic inside the newly built tunnel.

In some implementations, the client crypto-service and the server crypto-service select a security protocol according to a cryptographic policy and communicate using the selected security protocol. In some implementations, selecting the security policy further comprises measuring network congestion and selecting the security policy to compensate for limited network bandwidth. In some implementations, selecting the security protocol further comprises querying a database of known network communication vulnerabilities, and switching to an alternative security protocol in response to determining that a previously selected security protocol is designated as vulnerable. In some implementations, selecting the security protocol further comprises querying a database of available security protocols and switching to an alternative security protocol that was not previously available.

Implementations can switch to a different security protocol (e.g., a cyphersuite) for a variety of reasons. For example, based on network congestion levels, the crypto-service can dynamically switch to a more communication size friendly algorithm to compensate for the bad network conditions. In addition, the crypto-service can establish the sessions ahead of the actual application use time based on prediction and machine learning to optimize the latency during actual usage. Further, when there are substantial vulnerabilities and/or breaches in security libraries, the crypto-service can easily switch or update to a safe version or variant of the security protocol without the need for a software update or other manual fix. This ability to swap the cryptographic suite without software updates is one feature of cryptoagility.

In some implementations, the client crypto-service opens the secure encrypted tunnel to the server crypto-service in response to the initiated communication from the legacy application.

In some implementations, the client crypto-service opens the secure encrypted tunnel to the server crypto-service prior to the initiated communication from the legacy application.

In some implementations, the legacy application opens the connection to the destination, but offloads the protocol and cryptography to the crypto-service and acts as a messenger to relay messages back and forth.

In accordance with some implementations, a system for applying secure cryptographic communication between legacy applications and corresponding external services includes a user device and a server system. Each of the user devices and the server system includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a client device and a server system. Each of the user devices and the server system includes one or more processors, memory, and one or more programs stored in the memory. The programs are configured for execution by the one or more processors. The programs include instructions for performing any of the methods described herein.

Thus methods and systems are provided for applying secure cryptographic communication between legacy applications and corresponding external services

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

FIG. 10 illustrates APIs for offloading and direct delegation, in accordance with some implementations.

FIGS. 11A-11D provide skeletal versions of the core C API functions used by some CryptoServices.

Like reference numerals refer to corresponding parts throughout the drawings.

Figure 1A:
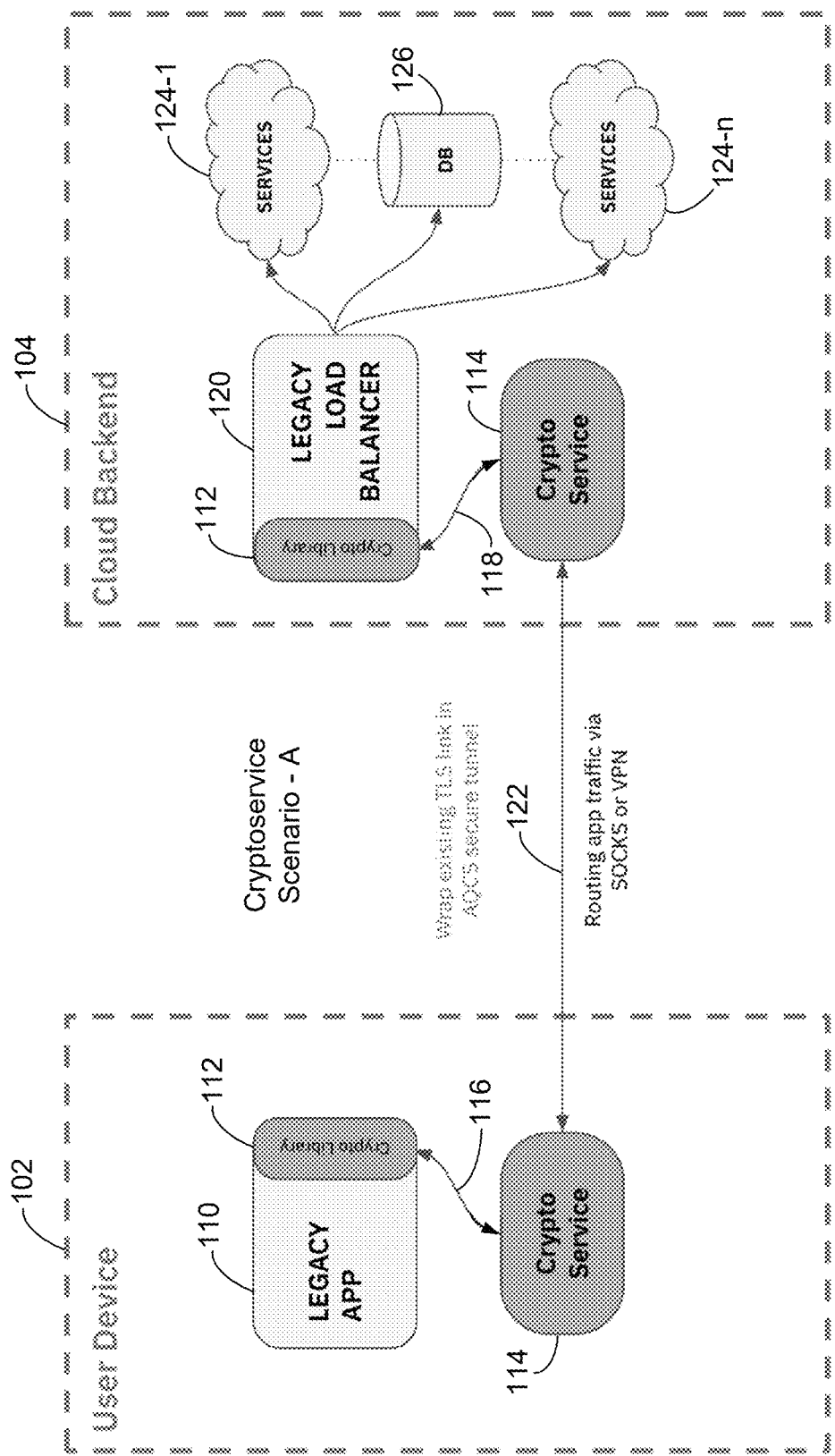
FIGS. 1A-1D illustrate a few crypto-service scenarios, in accordance with some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

As used herein, the acronym "AQ" is sometimes used to designate "AI+Quantum" (e.g., as in Sandbox AQ), "AQCS" designates an AQ Cryptoservice, and "AQCSD" designates an AQCS daemon. In some instances, the terms "CS," "crypto-service," or "CryptoService" are used as synonyms for "Cryptoservice." The acronym "PQC" is sometimes used to designate "post-quantum computing."

DESCRIPTION OF IMPLEMENTATIONS

A CryptoService is the centralized authority/agent for performing any cryptographic actions in a secure network communication suite. To provide cryptography-related services (e.g. TLS) to other applications in the system, the program provides easy-to-use APIs (e.g., a protocol buffer or JSON request system).

The CryptoService serves as a proxy and reverse proxy for cryptography used in the system. The CryptoService integrates with and underlying cryptography library and offers high cryptoagility without changing any of the applications using it.

The CryptoService decouples cryptographic processing from the applications that require cryptography. An application simply requests a secure connection, and the CryptoService handles the rest of the cryptographic life cycle.

Some practical benefits from the decoupling include:
  decoupling provides cryptoagility (the specific crypto that is used is no longer hardcoded in the applications);
  decoupling reduces the burden of using cryptography (centralizing the heavy lifting and ensuring correct implementation/usage of crypto libraries);
  decoupling improves performance by centralization (e.g., certificates and/or certificate revocation lists (CRLs) are downloaded and verified only once for the entire system and secure tunnels can be reused);
  decoupling improves performance using the fact that the CryptoService can execute performance-enhancing decisions during its own running time (e.g., predictively open tunnels, download keys, check connection quality, act when plugged in, or act when on WiFi).

FIGS. 1A-1D demonstrate securing mobile and web applications using a CryptoService having a configurable/smart policy, with governance over:
- what application to secure:
- when to initiate cryptographic runtime:
- what networking protocols to use; and
- what ciphersuites to select.

FIGS. 1A-1D illustrate several scenarios of using a CryptoService, including:
- passing from TLS to PQTLS to SSH:
- wrapping an existing legacy application without modifying its source code:
- securing a legacy application with minor code modifications; and
- securing two legacy applications using the same Single Sign-On (SSO).

A model in which cryptography is completely decoupled from the legacy applications involves some changes in the legacy applications in order to communicate with the CryptoService. Disclosed CryptoService implementations provide compatible solutions to customers who have not yet updated their legacy applications or servers yet.

The solution shown in FIG. 1A addresses this scenario. The CryptoService encapsulates all application traffic and routes the traffic via a secure encrypted tunnel. In the tunnel, however, the legacy applications are still doing their own TLS connections, which has additional overhead. The advantage of this solution is its simplicity.

As shown in FIG. 1A, an ephemeral encrypted tunnel routes application traffic. All application traffic goes through the secure tunnel. In this scenario, traffic for the legacy application 110 is routed through a PQC-enabled crypto-agile encrypted tunnel. The CryptoService 114 tunnels traffic from the user device 102 to a cloud backend 104, where the traffic reaches its intended destination. The CryptoService 114 is in charge of starting up and tearing down an encrypted tunnel, instructing the system which traffic should be redirected to the CryptoService 114, and routing that traffic both ways through the tunnel.

In the scenario of FIG. 1A, a user device 102 runs one or more legacy user applications 110, which utilize a local crypto library 112. Because the legacy user application 110 is not modified in this scenario, the legacy application 110 continues to use the crypto library 112. However, the CryptoService 114 encapsulates the communication. In some implementations, the CryptoService 114 encapsulates the communication by intercepting (116) outbound communication from the user device 102 using a local network filter and redirects the outbound communication through the CryptoService 114. The CryptoService parses the destination and builds a secure tunnel to the destination (either by configuration or opportunistically). The CryptoService 114 encapsulates the original traffic and routes (122) the application traffic through the tunnel (e.g., using SOCKS or VPN).

At the backend 104, the CryptoService 114 receives the communication, and sends (118) the communication to a legacy load balancer 120 through the crypto library 112. The legacy load balancer 120 then communicates with an appropriate service 124 (e.g., one of the services 124-1, . . . , 124-n) and/or an appropriate database 126. Return communication reverses these steps.

Some implementations make sure the tunnel is live before use. In some implementations, another program running on the user device (e.g., a Crypto Conductor 222) looks for system events that signal when a user application starts or stops. If only one application is using the tunnel at any given time, the Crypto Conductor 222 can open the tunnel before the application starts and close the tunnel after the application terminates. If multiple applications are sharing the tunnel, the tunnel remains live until the last application terminates.

In some implementations, the CryptoService 114 checks the destination IP address for each TCP/UDP packet and creates a separate tunnel per connection. In this case, no pre-established tunnels are created until the Crypto Conductor 222 learns the pattern or else a list of tunnels to pre-establish is specified in a static config file (if the same config file is always used and/or hardcoded in the application). This illustrates that the CryptoService 114 is not doing the same job as a simple VPN (which routes all traffic through a single tunnel).

Figure 1B:
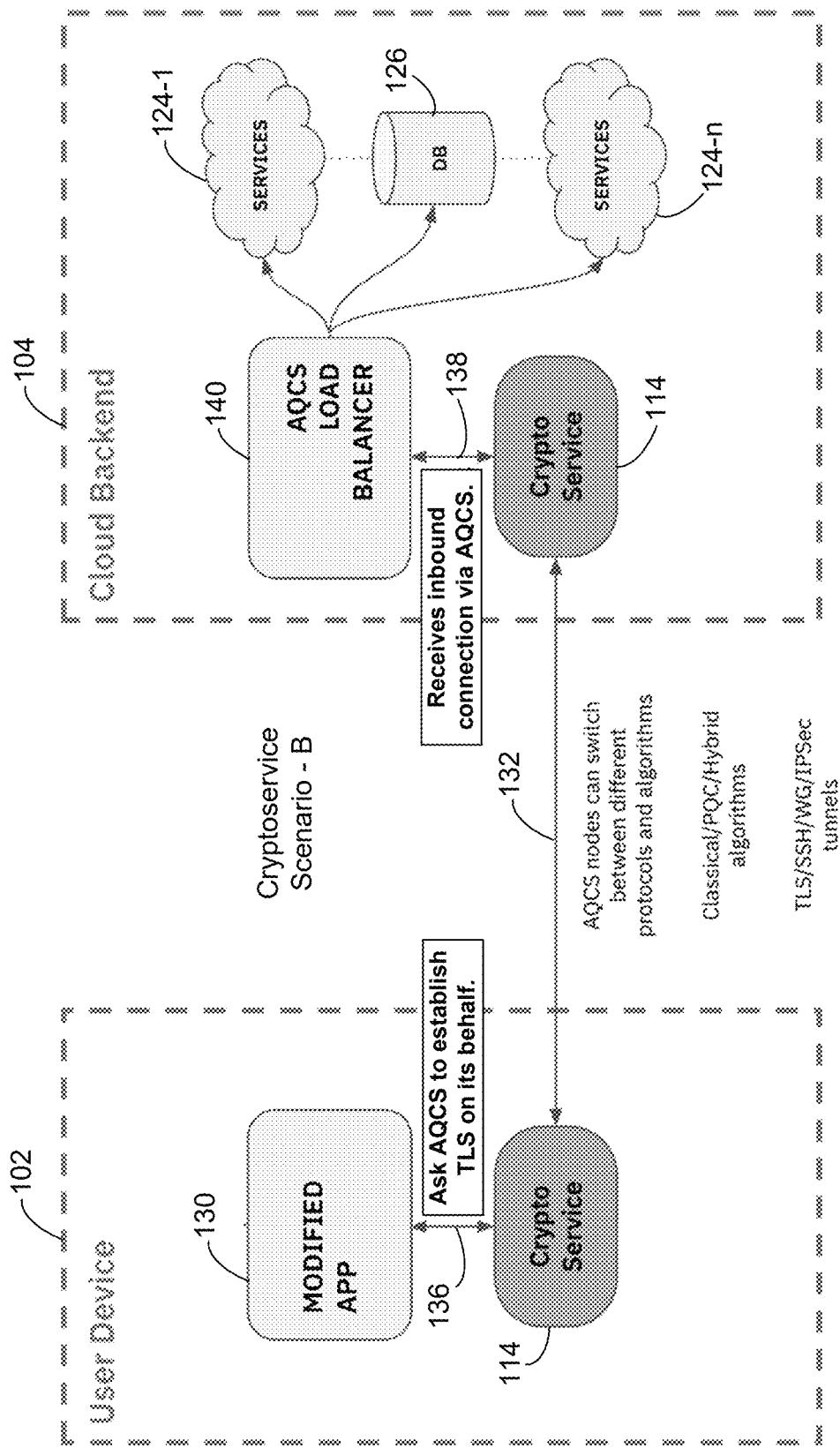

In FIG. 1B, the CryptoService 114 handles TLS on behalf of client applications. This has better performance because it avoids duplicate encryption. In particular, the CryptoService 114 establishes secured tunnels on behalf of the applications, eliminating the burden of cryptography. A modified legacy application 130 asks the CryptoService 114 to create a new secure connection for it. In response, the CryptoService 114 opens a port that forwards the connection to the modified legacy application. In some implementations the CryptoService 114 supports plain TLS 1.2 and 1.3 as well as PQTLS.

The scenario illustrated in FIG. 1B utilizes integration with the Crypto Conductor 222. In some implementations, the process makes ciphersuite choices for each network connection based on the specific network conditions for that connection (e.g., a single modified application 130 may need three different connections to three different destinations, each with its own set of dynamic network conditions (e.g., bandwidth, latency, and/or lost packets). Based on those distinct conditions, the Crypto Conductor 222 may select a different ciphersuite for each of the connections. This enables fine-grained optimization versus using a single tunnel.

This arrangement has a few added advantages. The Crypto Conductor 222 can detect patterns of usage and instruct the CryptoService 114 to open tunnels before they are even requested. In addition, the CryptoService 114 can utilize load balancing using a round-robin model for requests from the modified use applications 130.

The scenario in FIG. 1B is similar to the scenario in FIG. 1A at a high level. In both cases, the CryptoService 114 mediates communication between a legacy application and the external services 124 or databases 126 it connects to. However, the legacy application 110 has been modified to create a modified application 130, which contacts (136) the CryptoService directly. In addition, the load balancer 120 in FIG. 1A is replaced with a modified (or substitute) AQCS load balancer 140, which communicates directly with the CryptoService 114. The communication 132 over the network can utilize any of the established CryptoService algorithms, and can switch as needed.

Figure 1C:
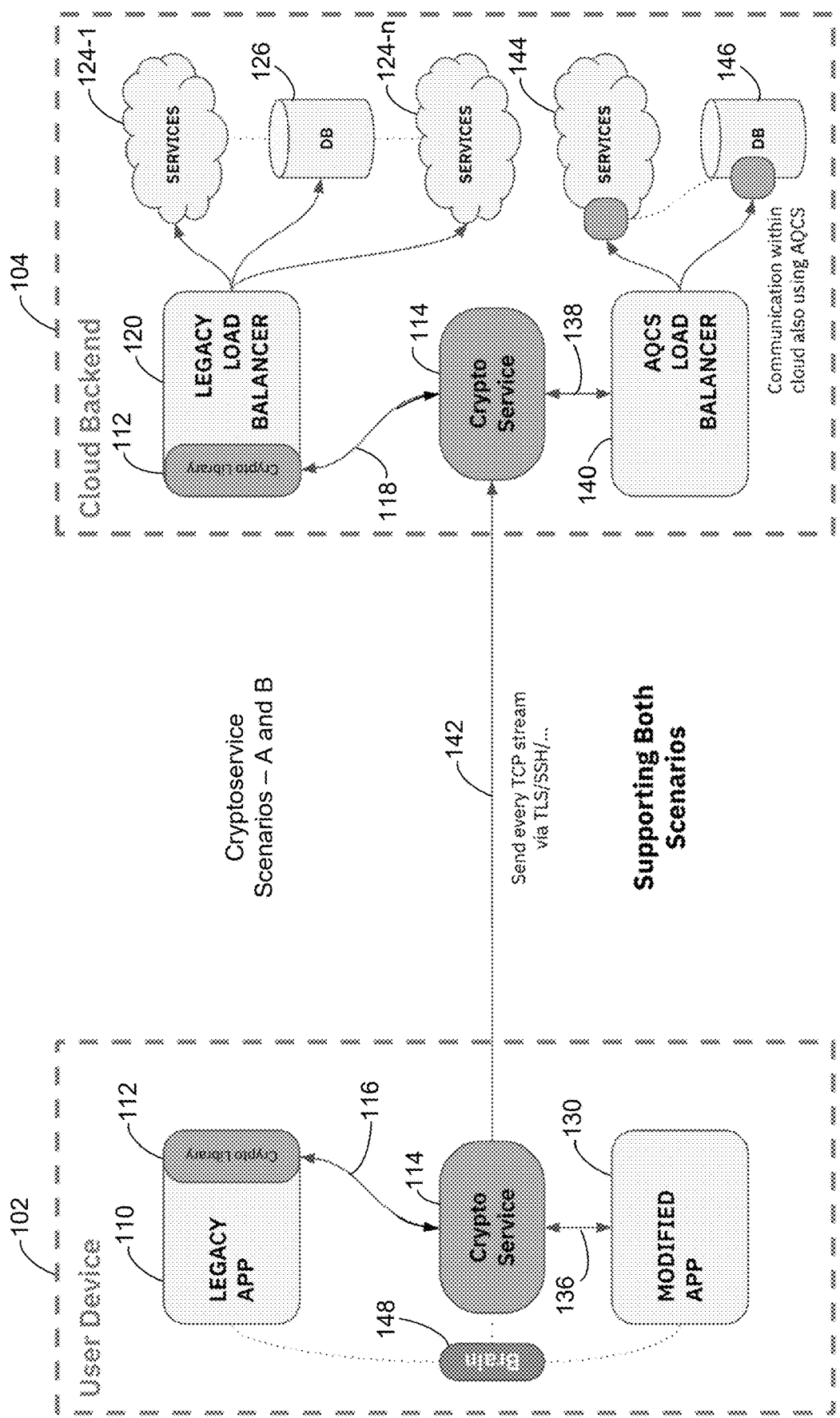

FIG. 1C forms a hybrid of the systems illustrated in FIGS. 1A and 1C. The system in FIG. 1C support multiple deployment scenarios:
- legacy applications with legacy backend: use the architecture of FIG. 1A, wrapping application traffic in an encrypted VPN/SOCKS tunnel:
- modified applications with modified backend: use the architecture in FIG. 1B, which directly uses the CryptoService 114; and
- modified application with legacy backend, or vice versa: in these scenarios, either the application on the user device 102 or the load balancer on the backend 104 has be modified to communicate directly with the CryptoService 114, but not both. Because the CryptoService 114 can handle the scenarios of modified applications and modified load balancers, it can handle the scenario where only one side of the communication has been modified.

For cross-generational communications, the modified application 130 can ask the CryptoService to open a connection (e.g., a TLS connection), and contact the legacy load balancer if, for example, the new load balancers are saturated. This allows migrating applications at one pace and servers at a different pace. Particularly for large organizations, being able to migrate user devices and server systems at different rates can be essential because of the time required to perform all of the migration.

In some implementations, the CryptoService 114 and/or the Crypto Conductor 222 make decisions dynamically on how to route traffic.

In FIG. 1C, the communication 142 over the network typically uses TLS, SSH, or other security protocol, with the content separately encrypted by the CryptoService 114. In some implementations, a "brain" application 148 runs on the user device to coordinate cryptographic processes for multiple concurrent applications 110 and/or 130.

In some implementations, the services 144 and/or databases 146 are updated to handle cryptographically secure communications. In this way, even communications within the backend 104 are protected. Note that the original servers 124-1, . . . , 124-n and original database 126 have not been modified to accept cryptographically secure communications, so the communication between the legacy load balancer 120 and the original services/databases are not necessarily cryptographically secure.

Figure 1D:
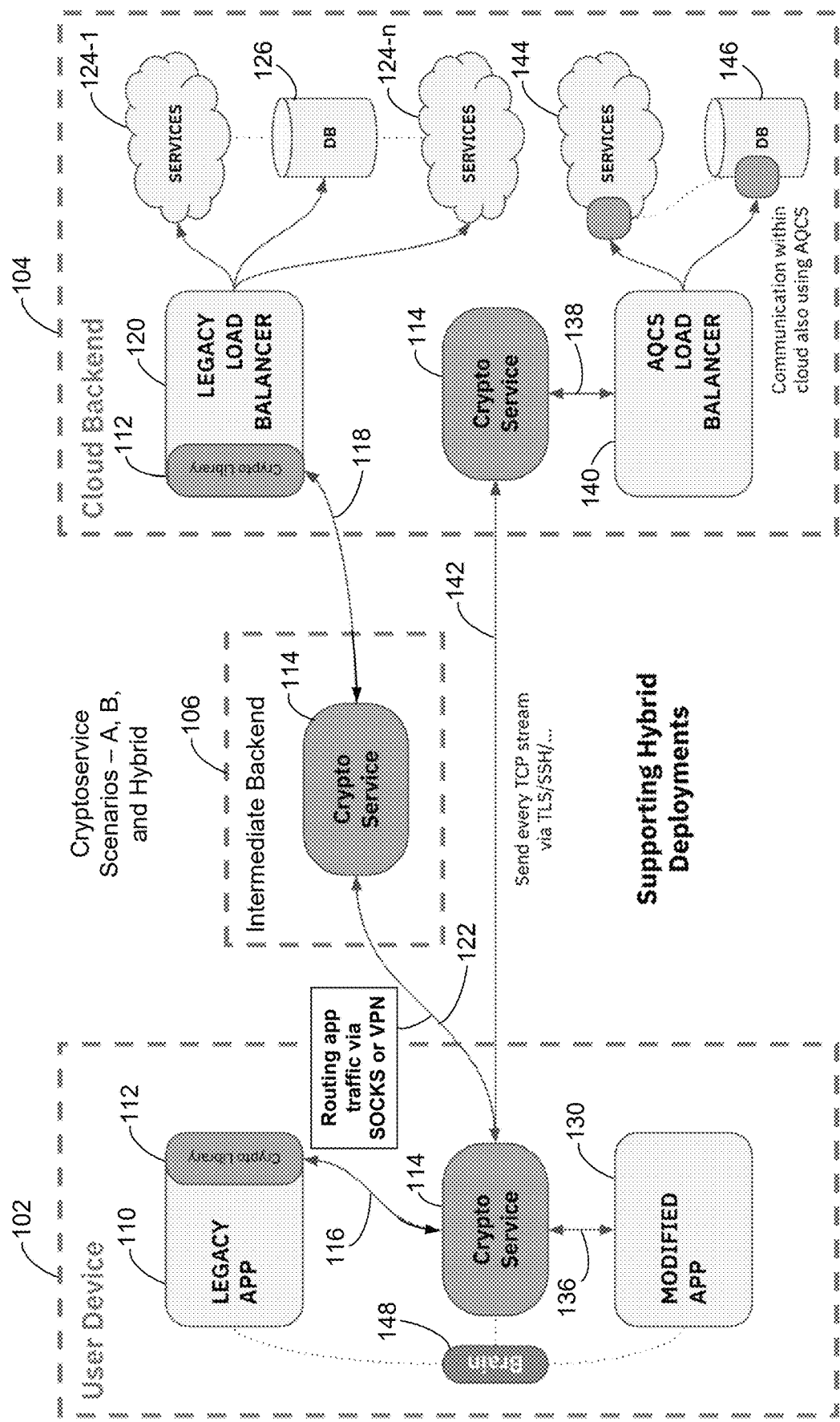

FIG. 1D adds one feature to the hybrid deployment in FIG. 1C. This arrangement allows users to gradually migrate their existing applications and backend services to the CryptoService 114 without compromising any functionality or interoperability of their original network topology. The main difference with the system of FIG. 1C is that it also allows the CryptoService 114 to function as a VPN, and thus reaches backends that cannot be modified. This system includes an instance of the CryptoService 114 running at an intermediate backend 106. As long as the intermediate backend 106 is relatively close to the backend 104, the majority of the exposure over the network occurs over the cryptographically secure channel 122 between the two instances of the CryptoService 114.

The CryptoService (AQCS) provides a variety of features, including:
- the CryptoService 114 runs in a standalone process:
- the CryptoService 114 can establish TLS connections (1.2 and 1.3) to existing TLS web servers;
- the CryptoService 114 can establish PQ-TLS (post-quantum TLS) connections to web servers:
- the CryptoService 114 has a local API via REST/gRPC/XPC, which allows applications to talk to the service:
- applications can request the CryptoService 114 to establish TLS connections for them. Once established, the CryptoService 114 opens a local TCP port that proxies plaintext application traffic into the encrypted tunnel;
- the CryptoService 114 can operate in proxy mode, where it automatically upgrades all application traffic to an encrypted tunnel while the application does not need to produce CryptoService signaling:
- the CryptoService 114 reads in fixed configuration information about what protocols to use for different applications:
- the CryptoService 114 interacts with the Crypto Conductor 222 to automatically figure out what protocols or ciphersuites to use for different applications:
- CryptoService-enabled clients can connect to CryptoService-enabled servers using not only TLS, but also SSH and other secure protocols that users can specify.
- the CryptoService 114 supports secure API communication with user space applications; and
- CryptoService instances include a discovery/orchestration (control plane like) protocol.

FIGS. 1A-1D illustrate the flow of data. In addition, the CryptoService provides a user interface so that users can see the activity. In some implementations, the user interface includes:
- an intuitive API for both external partners and internal applications (such as CryptoService VPN); and
- an abstraction to the types of protocol that are available (e.g., TLS, SSH, IPSec, and WireGuard).

Figure 2:
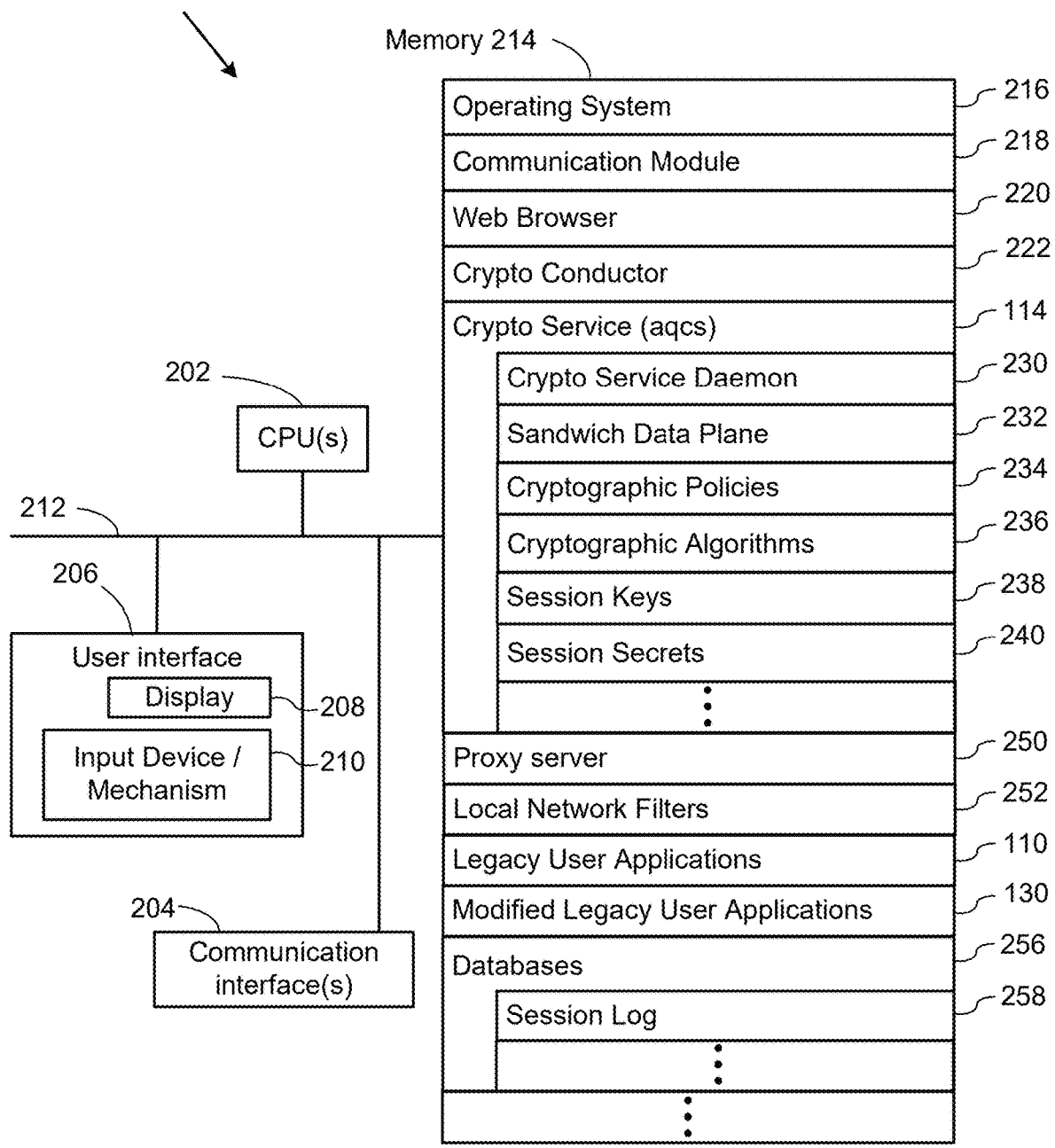
FIG. 2 is a block diagram of a computing device according to some implementations.

FIG. 2 is a block diagram illustrating a computing device 200 that can execute the crypto-service application 114. Computing devices 200 include desktop computers, laptop computers, tablet computers, smart phones, and other computing devices with a display and a processor capable of running a crypto-service application 114. A computing device 200 typically includes one or more processing units/cores (CPUs) 202 for executing modules, programs, and/or instructions stored in the memory 214 and thereby performing processing operations: one or more network or other communications interfaces 204: memory 214; and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard. In some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

Figure 8:
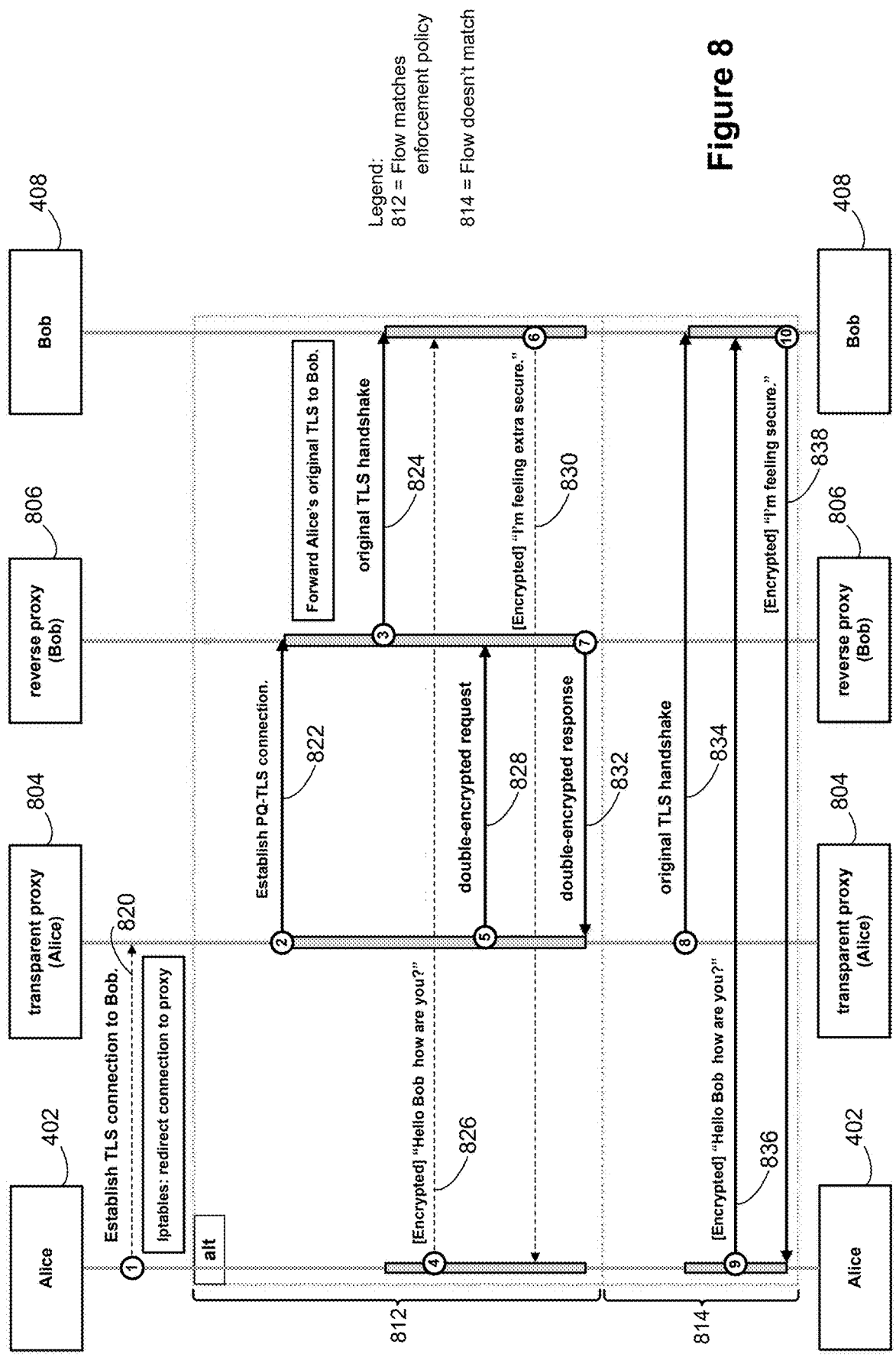
Figure 9:
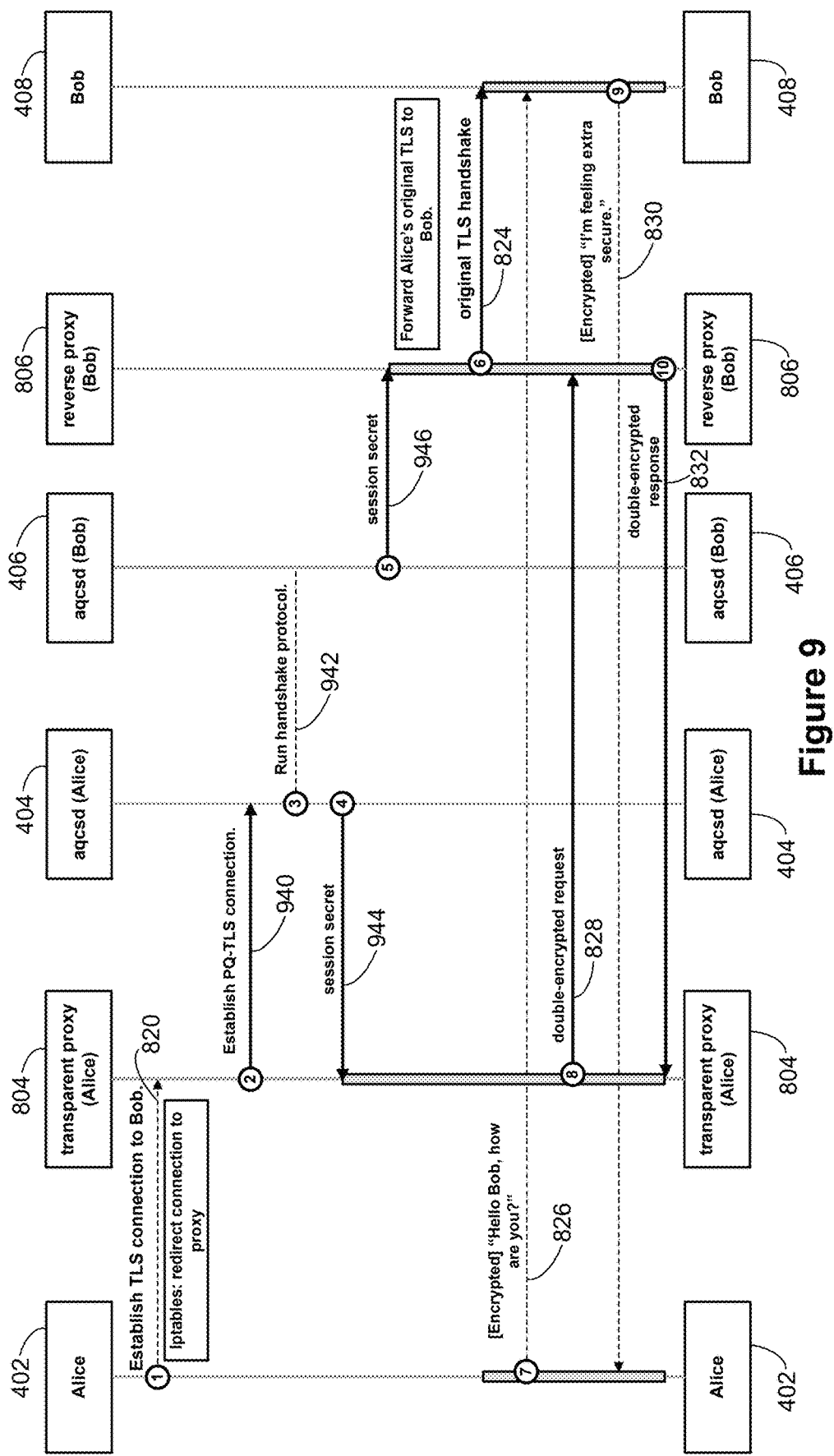

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer-readable storage medium. In some implementations, the memory 214, or the computer-readable storage medium of the memory 214, stores the following programs, modules, and data structures, or a subset thereof:
- an operating system 216, which includes procedures for handling various basic system services and for performing hardware dependent tasks;

a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on:

a web browser 220 (or other client application), which enables a user to communicate over a network with remote computers or devices:

a crypto conductor 222, which automates and optimizes protocols (e.g., by monitoring traffic patterns and sending instructions to open new secure tunnels before they are needed):

a crypto-service 114, which provides a cryptographic abstraction layer, as illustrated in FIGS. 1A-1D and FIGS. 4-9:

in some implementations, the crypto-service 114 includes a crypto-service daemon (aqcsd) 230, which is a daemon process that runs on client machines connected to the AQCS control plane. The daemon 230 is in charge of performing various handshake protocols for all of the secure transport needs of the system. For example, applications can offload a TLS handshake to aqcsd and in return obtain an established session secret and state:

in some implementations, the crypto-service 114 includes a cryptographic data plane 232, which is a client library for directly interacting with various record protocols to send protected data onto the network. Applications instantiate the record layer with a preestablished session secret and state received from the crypto-service daemon 230;

the crypto-service 114 includes one or more cryptographic policies 234, which specific quality, protocols, or other criteria. A policy can be applied to an individual legacy application 110 or multiple legacy applications.

the crypto-service 114 includes a plurality of cryptographic algorithms 236, which can be selected according to the relevant cryptographic policy:

the crypto-service 114 utilizes one or more session keys 238 and/or one or more session secrets 240 when setting up a secure connection between devices;

a proxy server 250, which can be used by the crypto-service 114, as illustrated in FIGS. 8 and 9:

zero or more network filters 252, which can be used to intercept outbound communications from the computing device 200;

one or more legacy user applications 110, which execute on the computing device 200. The legacy applications connect to other devices and/or external services over a communication network. The crypto-service 114 provides a secure communication layer for the legacy applications without modifying the code of the legacy applications:

one or more modified legacy user applications 130, which execute on the computing device 200. The modified legacy applications 130 connect to other devices and/or external services over a communication network. The crypto-service 114 provides a secure communication layer for the modified legacy applications 130 by having them call the crypto-service 114; and one or more databases 256, which store data used by the crypto-service 114, the proxy server 250, the local network filters 252, the legacy user applications 110, and/or the modified legacy user applications 130. In some implementations, the databases include a session log 258, which tracks when the crypto-service 114 is used. In some implementations, the databases store data as spreadsheet files, CSV files, XML files, flat files, JSON files, tables in a relational database, cloud databases, or statistical databases.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
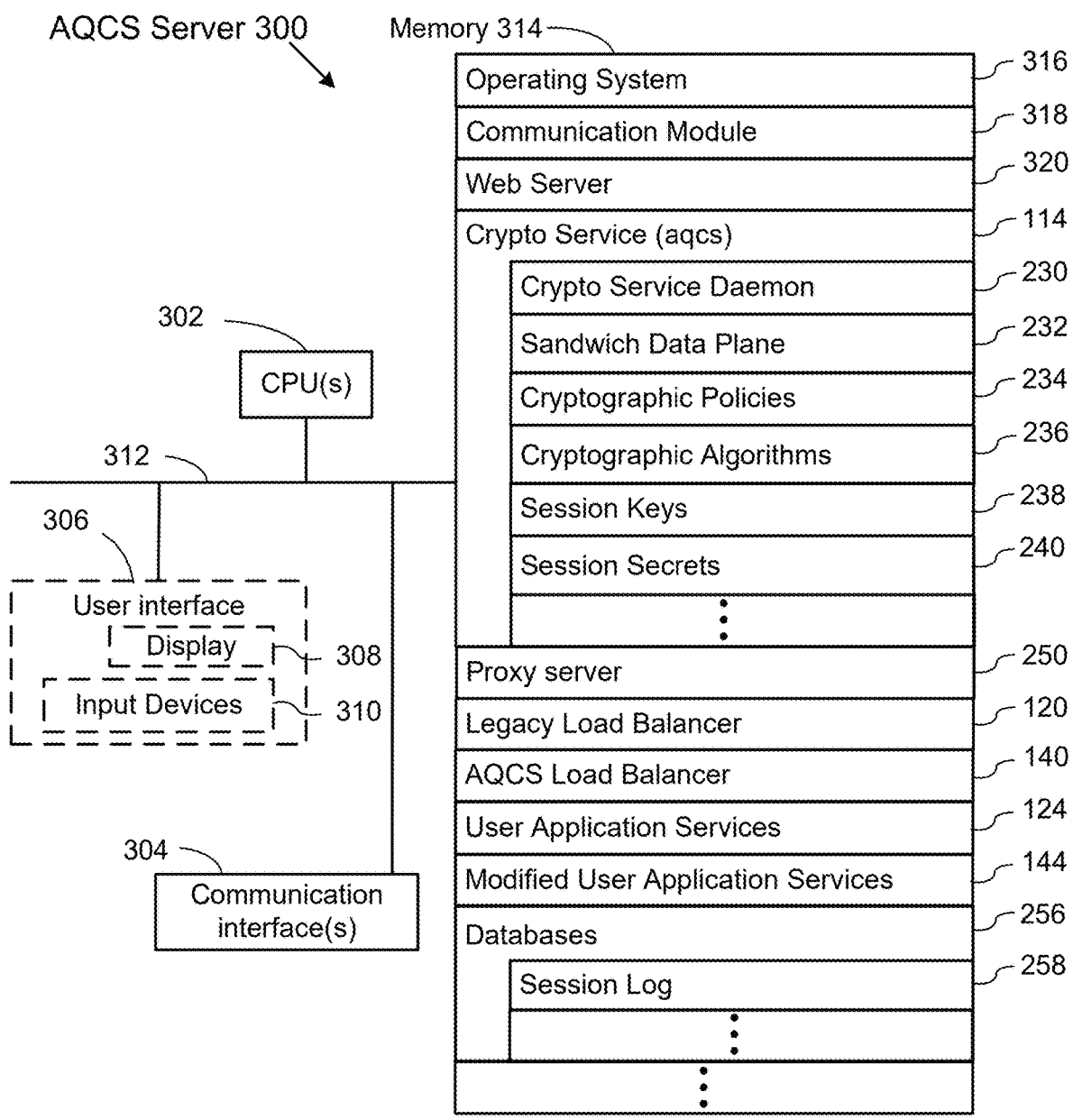
FIG. 3 is a block diagram of an AQCS server according to some implementations.

FIG. 3 is a block diagram of an aqcs server 300 in accordance with some implementations. An aqcs server 300 may host one or more databases 256 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 314 includes one or more storage devices remotely located from the CPU(s) 302. The memory 314, or alternatively the non-volatile memory devices within the memory 314, comprises a non-transitory computer-readable storage medium.

In some implementations, the memory 314, or the computer-readable storage medium of the memory 314, stores the following programs, modules, and data structures, or a subset thereof:

an operating system 316, which includes procedures for handling various basic system services and for performing hardware dependent tasks:

a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources:

a crypto-service 114, which provides a cryptographic abstraction layer, as illustrated in FIGS. 1A-1D and FIGS. 4-9;

in some implementations, the crypto-service 114 includes or utilizes a crypto-service daemon (aqcsd) 230, a cryptographic data plane 232, cryptographic policies 234, cryptographic algorithms, session keys 238, and/or session secrets 240, as described above for a computing device 200;

a proxy server 250, which can be used by the crypto-service 114, as illustrated in FIGS. 8 and 9;

a legacy load balancer 120, which distributes user requests across multiple user application services 124, as illustrated in FIGS. 1A-1D;

an aqcs load balancer 140, which distributes user requests across multiple servers, as illustrated in FIGS. 1A-1D. An aqcs load balancer 140 behaves like a legacy load balancer 120 in terms of distributing the load, but provides a secure communication channel between the balancer 140 and modified user application services 144 (modified to handle secure communication);

one or more legacy user applications 110, which execute on the computing device 200. The legacy applications connect to other devices and/or external services over a communication network. The crypto-service 114 provides a secure communication layer for the legacy applications without modifying the code of the legacy applications:

one or more modified legacy user applications 130, which execute on the computing device 200. The modified legacy applications 130 connect to other devices and/or external services over a communication network. The crypto-service 114 provides a secure communication layer for the modified legacy applications 130 by having them call the crypto-service 114; and one or more databases 256, which store data used by the crypto-service 114, the proxy server 250, the legacy load balancer 120, and/or the aqcs load balancer 140. In some implementations, the databases include a session log 258, which tracks when the crypto-service 114 is used. In some implementations, the databases store data as spreadsheet files, CSV files, XML files, flat files, JSON files, tables in a relational database, cloud databases, or statistical databases.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules or data structures not described above.

Although FIG. 3 shows an aqcs server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "aqcs server" include various groups, collections, or arrays of servers that provide the described functionality, and the physical servers need not be physically collocated (e.g., the individual physical devices could be spread throughout the United States or throughout the world).

In some implementations, the CryptoService uses the following combination:

aqcsd: a daemon process, which (1) runs on client machines connected to the CryptoService control plane and (2) coordinates various handshake protocols for all the secure transport needs of the system (e.g., applications can offload a TLS handshake to aqcsd and in return obtain an established session secret and state); and cryptographic-dp: the cryptographic data plane is a client library that directly interacts with various record protocols to send protected data onto the network. Applications instantiate the record layer with a pre-established session secret and state received from aqcsd.

The CryptoService daemon (e.g., aqcsd) is a fundamental building block for achieving a universal Transport Security Control Plane (TSCP). With TSCP, every time it needs to communicate securely with the outside world over the network, the underlying key materials and authenticity are provided and assured by the TSCP provider. No matter whether it's for a site-to-site IPSec session, browsing the web, streaming media, or hosting gRPC services, the TSCP provider takes care of the secure session establishment.

FIGS. 4-9 illustrate a secure communication between "Alice" and "Bob." In these figures, it is convenient to consider "Alice" and "Bob" as real people communicating using their electronic devices. However, in practice, the more common scenario is to consider "Alice" as a legacy application running on a device of a user and "Bob" as a backend service that is used by the "Alice" application.

Figure 4:
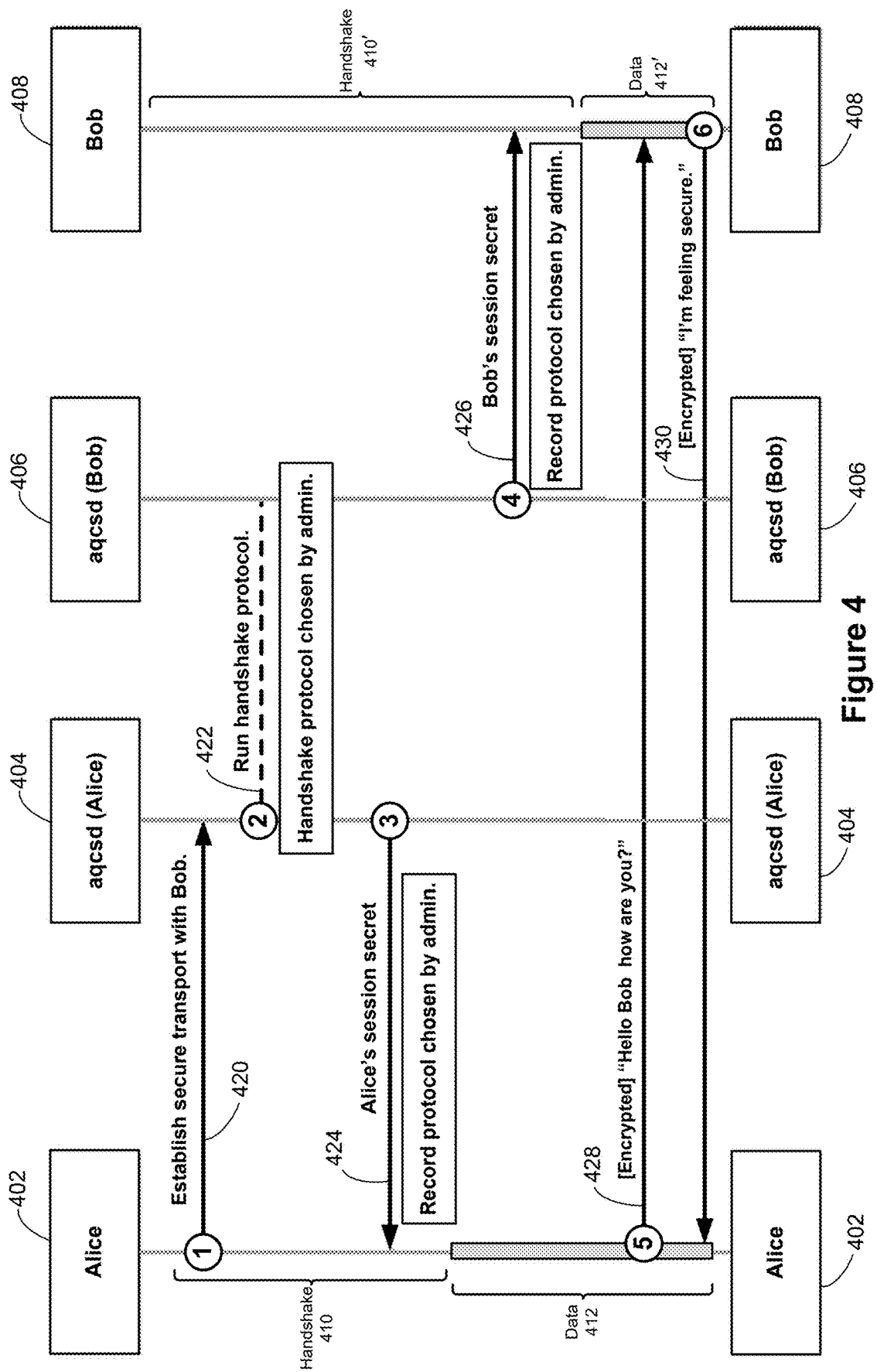
FIGS. 4-9 illustrate several alternatives for a crypto-service to handle communications between two users according to some implementations.

FIG. 4 provides a sequence diagram that visualizes a typical secure transport with TSCP. In this diagram, there are two users, Alice 402 and Bob 408, and they have corresponding CryptoService daemons 404 and 406. The timeline progresses from the top to the bottom in the diagram. For Alice 402, there is an initial handshake 410 and subsequent data exchange 412. Similarly, Bob 408 has an initial handshake 410' and subsequent data exchange 412'.

The sequence diagram in FIG. 4 starts by a request (420) from Alice to establish a secure transport with Bob. The daemon process 404 and 406 run (422) the handshake protocol. In some implementations, the handshake protocol is specified by admin (e.g., an administrative process or configuration). Once the handshake is completed, Alice's CryptoService daemon 404 sends (424) Alice her session secret and identifies the record protocol to use. Similarly, Bob's CryptoService daemon 406 sends (426) Bob his session secret and specifies the record protocol to use. At this point, Alice and Bob can conduct the substantive conversion, including the initial message 428 from Alice to Bob and the reply message 430 from Bob.

In some implementations, the TSCP provider enables a protocol-agnostic secure transport for applications, where the protocols are decided by admins of the control plane. For example, the application can issue HTTP requests, but the TSCP chooses whether it's going through TLS, DTLS, QUIC, or plain HTTP over IPSec.

The TSCP provider creates the public key infrastructure (PKI) by integrating with existing KMS/secret management systems, or using a zero trust/SSO, making trust management much simpler.

In some implementations, the TSCP provider further integrates with HSM/secure enclave solutions to offload all private key crypto operations into an isolated environment.

The sequence diagram in FIG. 4 does not specify a particular handshake protocol at step 2, and is shown in the diagram as a dotted line without any arrows. This is a handshake "abstraction," which can occur in a variety of ways. The are multiple good ways for handshake messages to occur.

The handshake plane is where all the handshaking of the protocol happens. This usually entails some form of key exchange, which ends up with one or more session keys to be used by the record plane for encryption and integrity purposes. In some implementations, the handshake plane also handles a signature part for authentication purposes.

The record plane is where actual application data goes through. The data is usually encrypted and authenticated using keys obtained through the handshake plane.

The control plane is used to enforce cryptography policies and add or update supported cryptographic algorithms.

Plans for encrypted communication can be (1) executed natively, (2) offloaded, or (3) delegated. As used herein, these terms mean:

Native: the plan occurs in the original process, and the CryptoService is not involved in the process;

Offloading: the plan cryptographic computation is done by the CryptoService, but no networking is performed by the CryptoService itself;

Direct delegation: the CryptoService does cryptographic computation and network operations, and the CryptoService makes direct contact with the endpoints asked by its clients; and Indirect delegation: the CryptoService does cryptographic computation and network operations, and the CryptoService communicates with another foreign CryptoService process that communicates with the final endpoint (e.g., the CryptoService acts in a role as a tunnel or proxy).

When a handshake is indirectly delegated, the data also has to be indirectly delegated (the final process would have no idea of how to decrypt the data it received otherwise). Basically, indirect delegation is equivalent to proxying or tunneling the complete connection, with both the handshake and the data plane.

Figure 5:
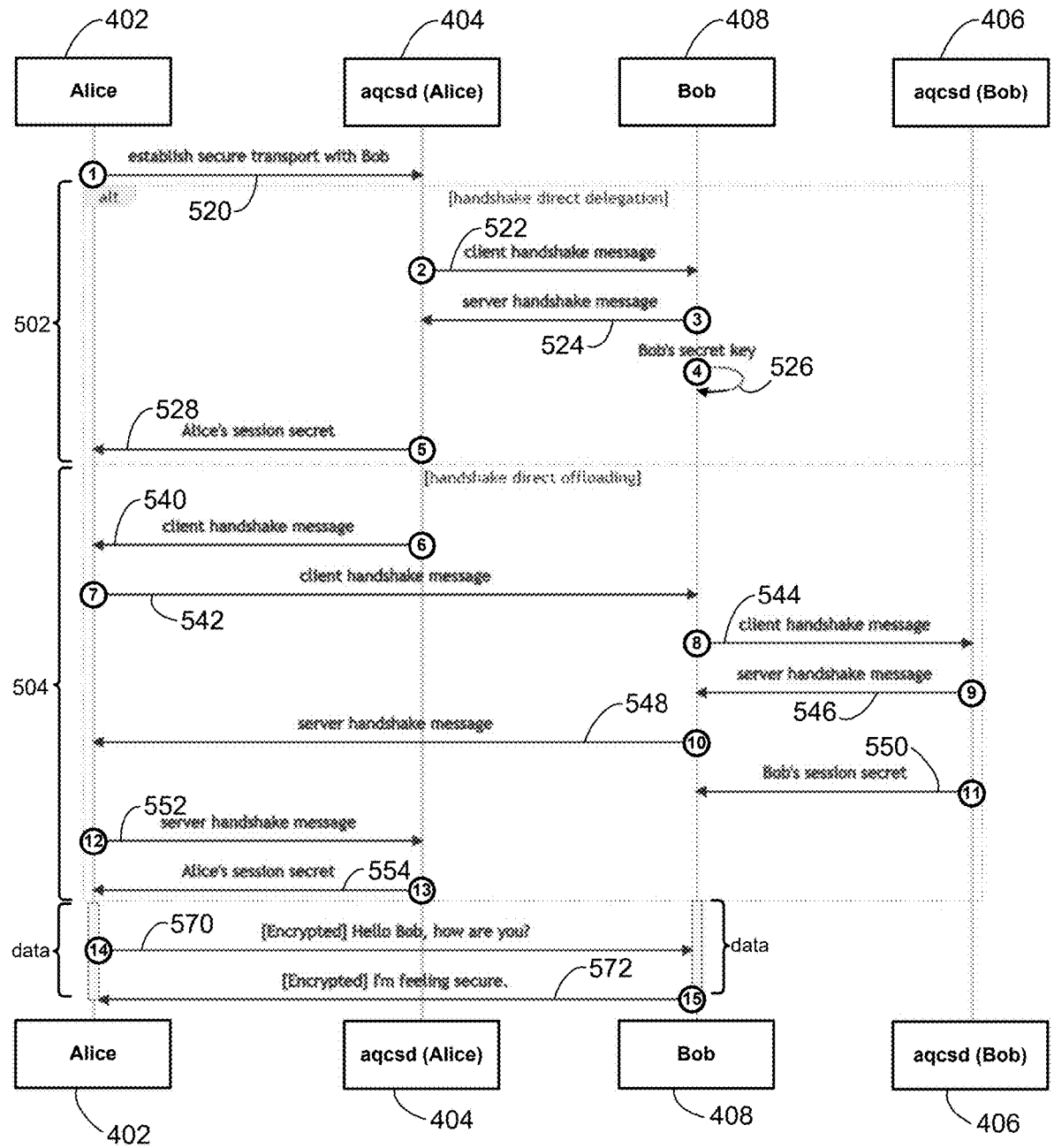

The sequence diagram in FIG. 5 illustrates the difference between offloading and direct delegation for the handshake plane. In the sequence diagram of FIG. 5, two alternatives are shown for the handshake. The first portion 502 illustrates handshake direct delegation and the second portion 504 illustrates handshake direct offloading. The final data portion of the diagram illustrates Alice 402 sending (570) a message to Bob 408 and Bob 408 sending (572) a reply message to Alive 402.

In the handshake direct delegation alternative 502, Alice requests (520) a secure transport with Bob, and the CryptoService daemon 404 on Alice's device sends (522) a handshake message to Bob. Bob's device returns (524) a handshake message to Alice's CryptoService daemon 404 and also establishes (526) Bob's secret key. Alice's CryptoService daemon 404 sends (528) Alice's session secret to her.

In the handshake direct offloading option 504, Alice requests (520) a secure transport with Bob, and the CryptoService daemon 404 on Alice's device sends (540) Alice a client handshake message. Alice 402 then sends (542) the client handshake message to Bob 408, who sends (544) the message to Bob's CryptoService daemon 406. Bob's CryptoService daemon 406 then sends (546) a server handshake message to Bob 408 and subsequently sends (550) Bob's session secret to Bob. After Bob 408 receives the server handshake message, Bob 408 sends (548) the server handshake message to Alice 402, who sends (552) the server handshake message to Alice's CryptoService daemon 404. The handshake is completed when Alice's CryptoService daemon 404 sends (554) Alice her session secret.

Figure 6:
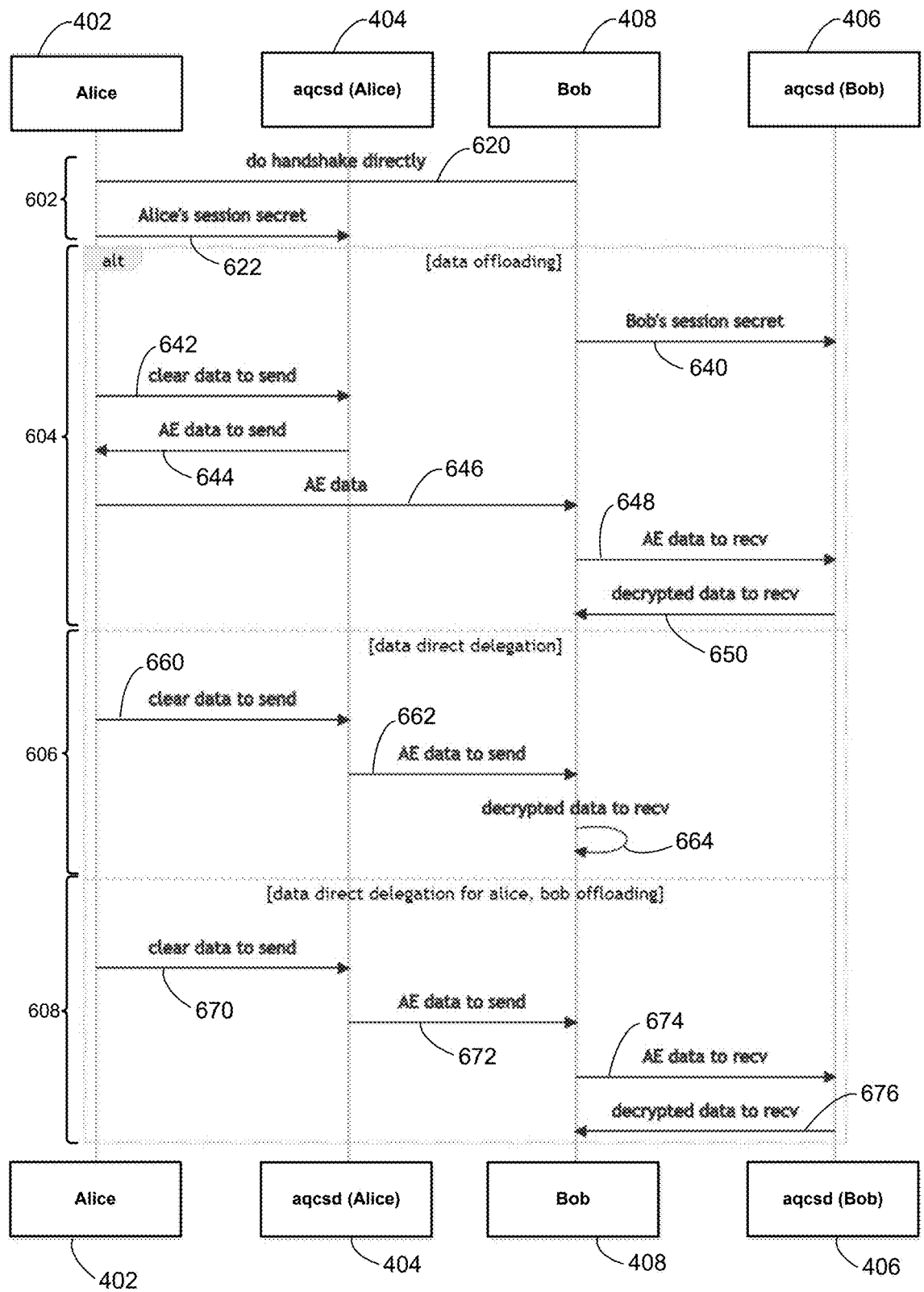

The sequence diagram in FIG. 6 includes a native handshake 620 in the first portion 602, and illustrates three alternatives for the data plan, including data offloading 604, data direct delegation 606, and data direct delegation for Alice with Bob offloading 608. In the direct handshake, Alice 402 sends (622) her session secret to her CryptoService daemon 404.

In the data offloading option 604, Bob 408 sends (640) his session secret to his CryptoService daemon 406. Alice sends (642) her clear (unencrypted) data to her CryptoService daemon 404, and the daemon 404 returns (644) the encrypted (Alice Encrypted=AE) data to Alice 402. Alice then transmits (646) the encrypted data to Bob 408, who forwards (648) the encrypted data to Bob's CryptoService daemon 406. Bob's CryptoService daemon 406 decrypts the data and sends the decrypted data to Bob 408.

In the data direct delegation option 606, Alice sends (660) the unencrypted data to her CryptoService daemon 404, which encrypts the data and sends (662) the encrypted data to Bob 408. Bob decrypts (664) the data.

In the data direct delegation for Alice, Bob offloading option 608, Alice sends (670) the unencrypted data to her CryptoService daemon 404, which encrypts the data and sends (672) the encrypted data to Bob 408. In this option, Bob forwards (674) the encrypted data to his CryptoService daemon 406. Bob's CryptoService daemon 406 decrypts the data and sends (676) the decrypted data to Bob 408.

Indirect delegation is equivalent to creating a proxy or creating tunnels multiplexing connections. A transparent proxy is a case of indirect delegation Direct delegation is more complex for the CryptoService because the CryptoService has to support every configuration combination possible. In some implementations, direct delegation mode is implemented on top of an existing proxy (e.g., Envoy) or another process dedicated to route data.

FIG. 10 illustrates APIs for offloading and direct delegation, in accordance with some implementations.

Figure 7:
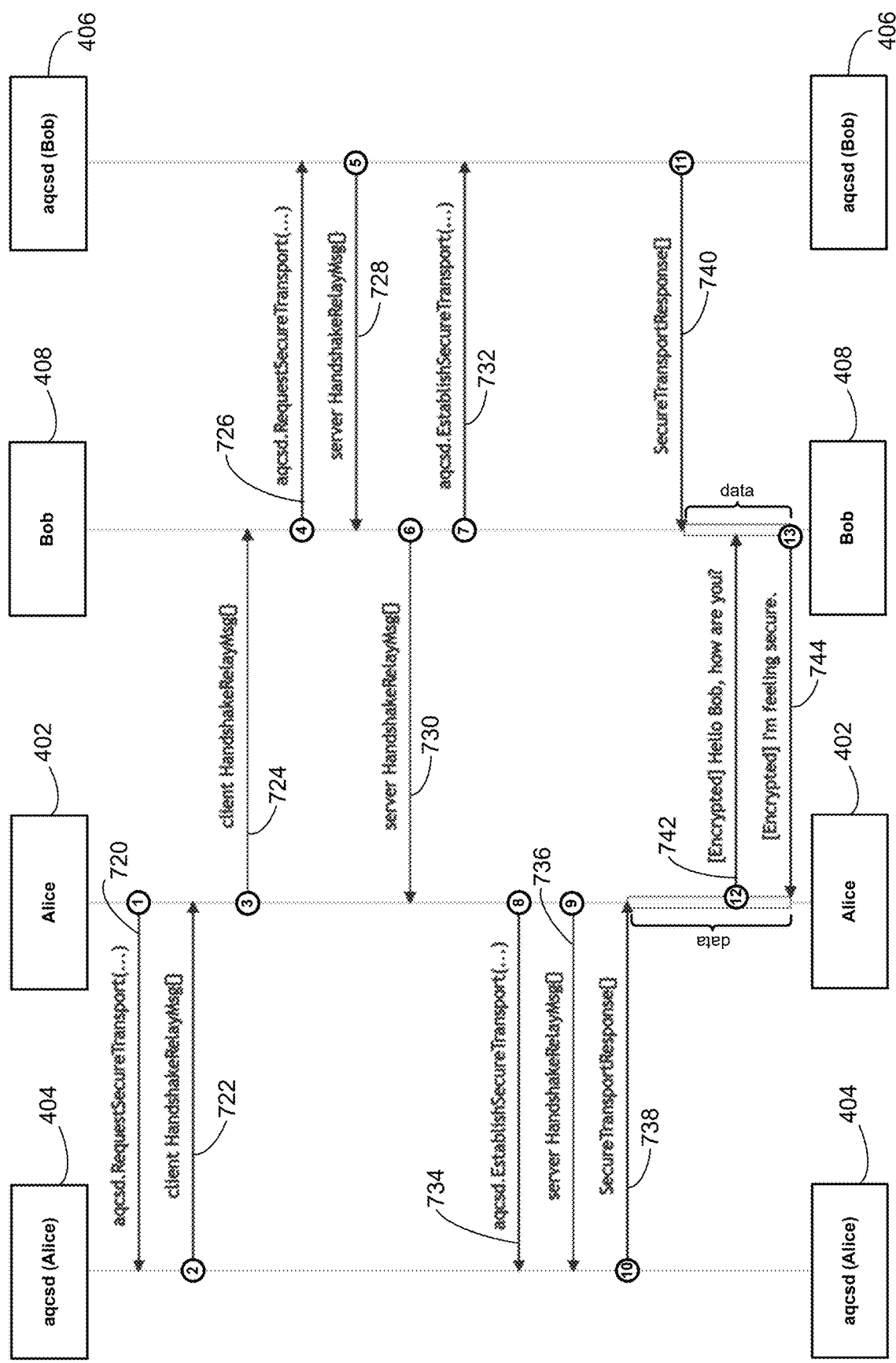

FIG. 7 puts the service definition in a sequence diagram, with offloaded handshake and native records.

In the sequence diagram, Alice 402 requests (720) secure transport from her CryptoService daemon 404, which return (722) a client handshake message. Alice 402 then sends (724) the client handshake message to Bob 408, who requests (726) secure transport with Alice (e.g., forwarding the client handshake message from Alice). Bob's CryptoService daemon 406 returns (728) a server handshake message to Bob 408, who sends (730) the server handshake message to Alice and also confirms (732) the establishment of the secure transport in a message to his CryptoService daemon 406. After Alice receives the server handshake message from Bob, she sends (734) a confirmation message to her CryptoService daemon 404 and also sends (736) the server handshake message top her CryptoService daemon

404. Alice's CryptoService daemon 404 sends (738) Alice 402 a secure transport response, at which point she is ready to send a message to Bob. Similarly, Bob's CryptoService daemon 406 sends (740) Bob 408 a secure transport response, at which point Bob is ready to send or receive messages from Alice. In this example, Alice sends (742) an encrypted message and Bob responds (744) with an encrypted response.

The offloading mode can be done directly in-process. This makes sense when implementing a CryptoService daemon using an existing proxy (e.g., Envoy) and there is only one process in the end. It also improves performance for the data plane by removing the roundtrip problem. Moreover, in the case of Envoy, some implementations expose the CryptoService control plane API in potentially two ways:

- by listening to a port from Envoy's own process (e.g., integrating into Envoy's architecture);
- through its existing control plane+xDS system (based on protobuf and gRPC).

The CryptoService supports symmetric crypto algorithms, the TLS cipher suite, the SSH cipher suite, plus additional cryptographic protocols.

In some implementations, cryptographic plugins must be signed. This is validated by the PKI.

Some CryptoService implementations utilize libaqcs, and libaqcs implements most of aqcsd's features. Skeletal versions of the core C API functions are shown in FIGS. 11A-11D.

A gRPC-offloaded stream pipes data between an open socket and a gRPC endpoint. Combined with a cryptographic stream abstraction, the handshake or the record plane can be offloaded.

The API illustrated in FIGS. 11A-11D provides another level of abstraction on top of libaqcs-core. This enables the choice of various backends for the handshake and record planes.

The identified backend for the handshake plane can be (1) a cryptographic library, through native function calls or (2) a gRPC client talking to the CryptoService.

The identified backend for the record plane can be (1) a cryptographic library, through native function calls or (2) KTLS for TLS.

In some implementations, the CryptoService daemon uses the libaqcs-client and exposes the offloading and control APIs through gRPC services. It uses the gRPC-offloaded streams to offload handshakes and/or records.

The sequence diagram in FIG. 8 summarizes the setup and two modes of operation for the transparent proxy scenario. Regardless of the mode, all of the outbound traffic of Alice (the application) is intercepted and redirected to the client-side transparent proxy via iptables.

In FIG. 8, Alice 402 sends (820) a request to the transparent proxy 804 to establish a TLS connection with Bob. The remainder of the sequence diagram is split into two cases depending on whether the flow matches the enforcement policy (case 812) or the flow doesn't match the enforcement policy (case 814).

In the matching scenario 812, the transparent proxy 804 and Bob's reverse proxy 806 establish (822) a PQ-TLS connection, and then the reverse proxy 806 forwards (824) the original TLS request to Bob 408. When Alice sends (826) an encrypted message to Bob, the portion of the transport between the transparent proxy 804 and the reverse proxy 806 is double-encrypted (828). Similarly, the encrypted reply 830 from Bob is double encrypted (832) in the portion of the transport between the reverse proxy 806 and the transparent proxy 804.

In the non-matching scenario 814, after the request (820) from Alice, the TLS handshake is sent (834) directly to Bob. Subsequently, Alice sends (836) a message, which goes directly to Bob (bypassing the proxy 804 and reverse proxy 806), and Bob's reply 838 also bypasses the two proxies.

The proxies dynamically load lists of policies for the proxying behaviors. Consider the following example policy: traffic going to 11.22.33.44:443 will be proxied to the same address but at port 4433 over a PQ-TLS transport with Kyber768 as the KEM.

If the outbound flow matches the policy, then the transparent proxy establishes a PQ-TLS connection to 11.22.33.44:4433 and sends over the raw data in the original intercepted TCP connection. Although the original TCP connection is a TLS connection, the proxy treats the TLS record data as raw bytes and simply wraps around them. On the receiving end, the reverse proxy at 11.22.33.44:4433 terminates the PQ-TLS connection, reads a PROXY protocol header to figure out the final destination of the data (11.22.33.44:443), and forwards the raw data to the destination.

If the outbound flow doesn't match such policy, then the transparent proxy directly establishes a socket connection to the final destination, and forwards the raw bytes from the intercepted TCP connection.

The CryptoService daemon can deploy well-known open-source solutions such as Envoy/NGINX as the proxies, and create a new plugin/transport socket extension that offloads the key exchange part (which needs PQC) to the CryptoService. In this way, performance is guaranteed because the proxies have all the advanced features (e.g., connection pooling and session affinity) while PQC transition and cryptoagility can be done as the TLS handshakes are offloaded to a side service.

FIG. 9 illustrates using a CryptoService daemon with kernel/hardware offloaded to TLS. FIG. 9 is similar to FIG. 8, but deals only with the case where the flow matches the enforcement policy and added the CryptoService daemons 404 and 406 in the middle between the two proxies 804 and 806. In particular, the transparent proxy sends (940) the TLS connection request to Alice's CryptoService daemon 404, which runs (942) the handshake protocol with Bob's CryptoService daemon 406. Alice's CryptoService daemon 404 sends (944) the session key to the transparent proxy 804 and Bob's CryptoService daemon sends (946) the session secret to the reverse proxy.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of applying secure cryptographic communication between legacy applications and corresponding external services, comprising:
at a user device running a client crypto-service and having one or more processors and memory:
receiving input directed to a legacy application;
in response to the input, and in accordance with a determination that an enforcement policy applies to the legacy application:
initiating, by the legacy application, a connection having a connection protocol over a secure communication protocol to an external service not running on the user device;
establishing, by the client crypto-service, a post-quantum Transport Layer Security (PQ-TLS) connection with a server crypto-service, at a server system, the server crypto-service communicatively connected with the external service;
sending, by the legacy application via the secure communication protocol, an encrypted communication to the external service; and
encrypting the encrypted communication in the client crypto-service to generate a double-encrypted communication, and sending the double-encrypted communication to the server crypto-service, wherein the client crypto-service provides a secure encrypted tunnel, via the PQ-TLS connection, to the server crypto-service;
at the server system running the server crypto-service and having one or more processors and memory:
forwarding the connection protocol to the external service;
receiving the double-encrypted communication at the server crypto-service, and decrypting the double-encrypted communication to retrieve the encrypted communication; and
sending the encrypted communication to the external service, wherein the external service decrypts the encrypted communication using the connection protocol.

2. The method of claim 1, wherein communication between the client crypto-service and the server crypto-service uses a quantum-resistant cryptographic algorithm.

3. The method of claim 1, wherein the input is from a user at the user device.

4. The method of claim 1, wherein the secure communication protocol uses Transport layer Security (TLS).

5. The method of claim 1, wherein the external service runs at the server system.

6. The method of claim 1, wherein the server crypto-service communicates with the external service through a load balancer.

7. The method of claim 6, wherein the load balancer is part of the server crypto-service, which communicates with the external service over a secure channel.

8. The method of claim 1, further comprising, at the user device:
intercepting outbound communication from the user device by a local network filter and redirecting the outbound communication to the client crypto-service.

9. The method of claim 1, wherein the client crypto-service and the server crypto-service select a security protocol according to a cryptographic policy and communicate using the selected security protocol.

10. The method of claim 9, wherein selecting the security protocol further comprises measuring network congestion and selecting the security protocol to compensate for limited network bandwidth.

11. The method of claim 9, wherein selecting the security protocol further comprises querying a database of known network communication vulnerabilities, and switching to an alternative security protocol in response to determining that a previously selected security protocol is designated as vulnerable.

12. The method of claim 9, wherein selecting the security protocol further comprises querying a database of available security protocols and switching to an alternative security protocol that was not previously available.

13. The method of claim 1, wherein the client crypto-service opens the secure encrypted tunnel to the server crypto-service in response to the initiated connection from the legacy application.

14. The method of claim 1, wherein the client crypto-service opens the secure encrypted tunnel to the server crypto-service prior to the initiated connection from the legacy application.

15. A secure cryptographic communication system, comprising:
a user device running a client crypto-service and having one or more processors and memory; and
a server system running a server crypto-service and having one or more processors and memory; wherein the user device is configured to:
receive input directed to a legacy application;
in response to the input, and in accordance with a determination that an enforcement policy applies to the legacy application:
initiate, by the legacy application, a connection having a connection protocol over a secure communication protocol to an external service not running on the user device;
establish, by the client crypto-service, a post-quantum Transport Layer Security (PQ-TLS) connection with the server crypto-service, the server crypto-service communicatively connected with the external service;
send, by the legacy application via the secure communication protocol, an encrypted communication to the external service; and
encrypt the encrypted communication in the client crypto-service to generate a double-encrypted communication, and send the double-encrypted communication to the server crypto-service, wherein the client crypto-service provides a secure encrypted tunnel, via the PQ-TLS connection, to the server crypto-service; and
the server system is configured to:
forward the connection protocol to the external service;
receive the double-encrypted communication at the server crypto-service, and decrypt the double-encrypted communication to retrieve the encrypted communication; and
send the encrypted communication to the external service, wherein the external service decrypts the encrypted communication using the connection protocol.

16. The secure cryptographic communication system of claim 15, wherein the user device is configured to:

intercept outbound communication from the user device by a local network filter and redirecting the outbound communication to the client crypto-service.

17. The secure cryptographic communication system of claim 15, wherein the client crypto-service and the server crypto-service select a security protocol according to a cryptographic policy and communicate using the selected security protocol.

18. The secure cryptographic communication system of claim 17, wherein selecting the security protocol further comprises measuring network congestion and selecting the security protocol to compensate for limited network bandwidth.

19. The secure cryptographic communication system of claim 17, wherein selecting the security protocol further comprises querying a database of known network communication vulnerabilities, and switching to an alternative security protocol in response to determining that a previously selected security protocol is designated as vulnerable.

20. The secure cryptographic communication system of claim 15, wherein the client crypto-service opens the secure encrypted tunnel to the server crypto-service prior to the initiated connection from the legacy application.

* * * * *